(12) United States Patent
Nishikawa et al.

(10) Patent No.: US 10,270,290 B2
(45) Date of Patent: Apr. 23, 2019

(54) POWER SUPPLY DEVICE

(71) Applicant: Funai Electric Co., Ltd., Osaka (JP)

(72) Inventors: Takafumi Nishikawa, Osaka (JP); Naoyuki Wakabayashi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 316 days.

(21) Appl. No.: 15/245,550

(22) Filed: Aug. 24, 2016

(65) Prior Publication Data

US 2017/0063155 A1    Mar. 2, 2017

(30) Foreign Application Priority Data

Aug. 25, 2015 (JP) ................. 2015-166143

(51) Int. Cl.
*H02J 50/70* (2016.01)
*H02J 50/10* (2016.01)
*H02J 50/90* (2016.01)
*H02J 50/20* (2016.01)

(52) U.S. Cl.
CPC .............. *H02J 50/10* (2016.02); *H02J 50/20* (2016.02); *H02J 50/70* (2016.02); *H02J 50/90* (2016.02)

(58) Field of Classification Search
CPC ............. H02J 50/70; H02J 50/90; H02J 50/10
See application file for complete search history.

(56) References Cited

U.S. PATENT DOCUMENTS

| | | | |
|---|---|---|---|
| 7,907,043 B2 | 3/2011 | Mori | |
| 7,982,573 B2 | 7/2011 | Mori | |
| 7,999,650 B2 | 8/2011 | Mori | |
| 8,130,068 B2 | 3/2012 | Mori | |
| 8,830,694 B2* | 9/2014 | Kawano | H01L 29/0649 361/765 |
| 2013/0038281 A1* | 2/2013 | Sakakibara | B60L 5/005 320/108 |
| 2013/0093253 A1* | 4/2013 | Norconk | H02J 5/005 307/104 |
| 2013/0119779 A1* | 5/2013 | Jung | H01F 27/2871 307/104 |
| 2014/0152119 A1* | 6/2014 | Endo | H02J 50/50 307/104 |
| 2014/0183972 A1* | 7/2014 | Endo | H01F 38/14 307/104 |
| 2015/0145339 A1* | 5/2015 | Chiyo | H01F 27/38 307/104 |
| 2015/0311728 A1* | 10/2015 | Yun | H02J 5/005 307/104 |

(Continued)

FOREIGN PATENT DOCUMENTS

| | | |
|---|---|---|
| EP | 2 884 504 A1 | 6/2015 |
| JP | 2008-141202 A | 6/2008 |

(Continued)

*Primary Examiner* — Thienvu V Tran
*Assistant Examiner* — Pinping Sun
(74) *Attorney, Agent, or Firm* — Crowell & Moring LLP

(57) ABSTRACT

A power supply device includes a power supply portion, a power supply coil portion having a first end connected to the power supply portion and a second end connected to ground, and a counter wound coil portion that faces the power supply coil portion, the winding direction of which is opposite to that of the power supply coil portion, and the counter wound coil portion has an opened first end and a second end connected to ground.

20 Claims, 5 Drawing Sheets

(56) References Cited

U.S. PATENT DOCUMENTS

2015/0332827 A1    11/2015    Omori et al.
2015/0380154 A1*  12/2015    Kagami .............. H01F 27/2823
                                                          336/220
2016/0285312 A1*   9/2016    Maniktala ............... H02J 50/10

FOREIGN PATENT DOCUMENTS

JP          2012-135066 A    7/2012
JP           2014-72968 A    4/2014
WO    WO 2014/119296 A1    8/2014

* cited by examiner

FIRST EMBODIMENT

FIG.3    FIRST EMBODIMENT
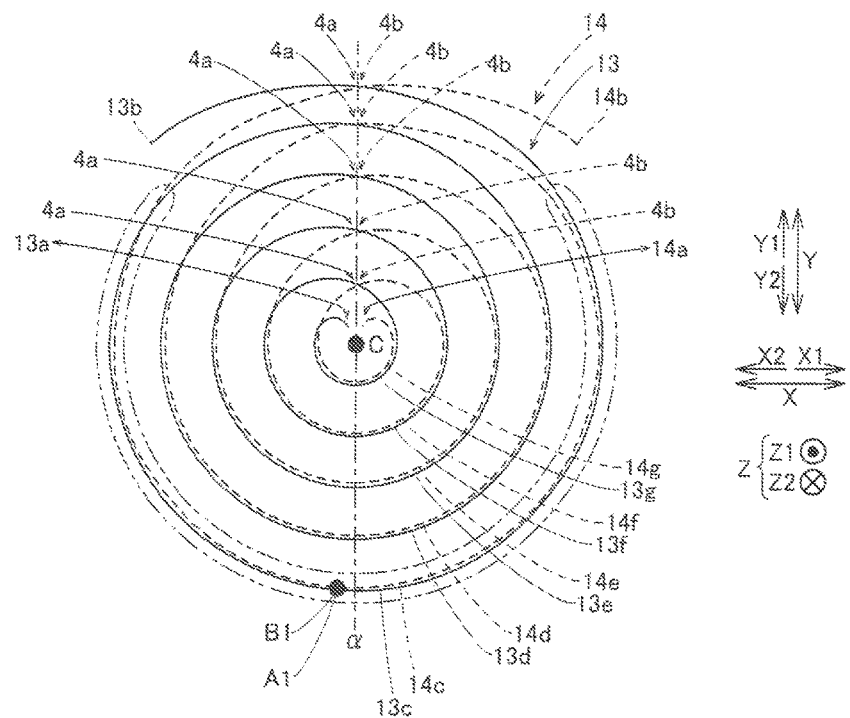
FIG.4
GENERATION OF INDUCED ELECTROMOTIVE FORCE
(a) EXAMPLE (COUNTER WINDING) CORRESPONDING TO FIRST EMBODIMENT
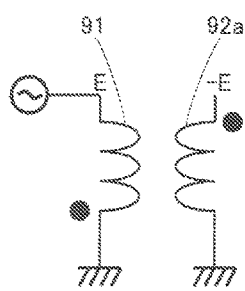
(b) COMPARATIVE EXAMPLE (FORWARD WINDING)
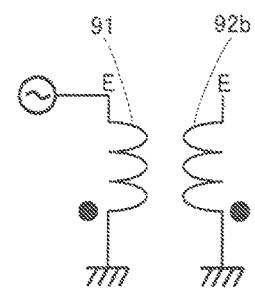

POWER SUPPLY DEVICE

CROSS-REFERENCE TO RELATED APPLICATION

The priority application number JP2015-166143, Power Supply Device, Aug. 25, 2015, Takafumi Nishikawa and Naoyuki Wakabayashi, upon which this patent application is based, is hereby incorporated by reference.

BACKGROUND OF THE INVENTION

Field of the Invention

The present invention relates to a power supply device, and more particularly, it relates to a power supply device including a power supply coil portion.

Description of the Background Art

A power supply device including a power supply coil is known in general, as disclosed in Japanese Patent Laying-Open No. 2014-072968, for example.

The aforementioned Japanese Patent Laying-Open No. 2014-072968 discloses a power supply device including a power supply coil connected to a power supply portion and a magnetic field canceler coil connected to the power supply portion. The power supply device suppresses a magnetic field (unnecessary magnetic field) generated in a predetermined direction from the power supply coil by applying a current to the magnetic field canceler coil. Consequently, the power supply device significantly reduces unnecessary radiation based on the unnecessary magnetic field.

In the power supply device described in the aforementioned Japanese Patent Laying-Open No. 2014-072968, the magnetic field canceler coil can significantly reduce the unnecessary radiation based on the unnecessary magnetic field from the power supply coil, but cannot significantly reduce unnecessary radiation based on an electric field from the power supply coil.

SUMMARY OF THE INVENTION

The present invention has been proposed in order to solve the aforementioned problem, and an object of the present invention is to provide a power supply device capable of significantly reducing or preventing unnecessary radiation based on an electric field generated from a power supply coil portion.

A power supply device according to an aspect of the present invention includes a power supply portion, a power supply coil portion having a first end connected to the power supply portion and a second end connected to ground, and a counter wound coil portion that faces the power supply coil portion, the winding direction of which is opposite to that of the power supply coil portion, and the counter wound coil portion has an opened first end and a second end connected to ground.

As hereinabove described, the power supply device according to this aspect of the present invention is provided with the power supply coil portion having the first end connected to the power supply portion and the second end connected to ground and the counter wound coil portion that faces the power supply coil portion, the winding direction of which is opposite to that of the power supply coil portion, and the counter wound coil portion has the opened first end and the second end connected to ground. Thus, the second end of the counter wound coil portion as well as the second end of the power supply coil portion is connected to ground, whereby induced electromotive force opposite to induced electromotive force in the power supply coil portion can be induced in the counter wound coil portion by a voltage applied to the power supply coil portion while the second end of the counter wound coil portion and the second end of the power supply coil portion are equipotential. Therefore, an electric field generated from the power supply coil portion can be suppressed by an electric field generated from the counter wound coil portion that faces the power supply coil portion. Consequently, unnecessary radiation based on the electric field generated from the power supply coil portion can be significantly reduced or prevented. As the counter wound coil portion is brought closer to the power supply coil portion, unnecessary radiation can be more significantly reduced or prevented.

In the aforementioned power supply device according to this aspect, both the power supply coil portion and the counter wound coil portion preferably have planar coil shapes in which conductor lines thereof are spirally wound in predetermined planes. According to this structure, the thicknesses of the power supply coil portion and the counter wound coil portion can be reduced, and hence the size of the power supply device in a thickness direction can be reduced. Furthermore, when the power supply coil portion and the counter wound coil portion face each other, the power supply coil portion and the counter wound coil portion can overlap each other in a relatively large range in a plan view, and hence the electric field generated from the power supply coil portion can be more effectively suppressed by the electric field generated from the counter wound coil portion. Consequently, the unnecessary radiation based on the electric field generated from the power supply coil portion can be more significantly reduced or prevented.

In this case, in a direction in which the power supply coil portion and the counter wound coil portion face each other, the conductor lines of the power supply coil portion and the counter wound coil portion are preferably wound in the same shape, and preferably have portions that overlap each other. According to this structure, a reverse voltage can be locally induced in each of the winding portions (the overlapping portions wound in the same shape) of the counter wound coil portion corresponding to the winding portions (the overlapping portions wound in the same shape) of the power supply coil portion. Thus, the electric field generated from the power supply coil portion can be suppressed by the electric field generated from the counter wound coil portion over a substantially entire portion of the power supply coil portion. Consequently, the unnecessary radiation based on the electric field generated from the power supply coil portion can be still more significantly reduced or prevented.

In this case, the conductor line of the counter wound coil portion preferably has substantially the same winding shape as that of the conductor line of the power supply coil portion, and faces the conductor line of the power supply coil portion, and the winding center of the counter wound coil portion substantially coincides with the winding center of the power supply coil portion in a plan view. According to this structure, the counter wound coil portion and the power supply coil portion can be arranged closer to each other as compared with the case where the winding center of the counter wound coil portion does not substantially coincide with (is deviated from) the winding center of the power supply coil portion in a plan view, and hence the unnecessary radiation based on the electric field generated from the power supply coil portion can be more significantly reduced or prevented.

In the aforementioned power supply device according to this aspect, the counter wound coil portion is preferably arranged with respect to the power supply coil portion to cancel out an electric field that the power supply coil portion generates. According to this structure, the unnecessary radiation based on the electric field generated from the power supply coil portion can be effectively significantly reduced or prevented.

In the aforementioned power supply device according to this aspect, the power supply coil portion and the counter wound coil portion preferably have substantially the same size, as viewed in a direction in which the power supply coil portion and the counter wound coil portion face each other. According to this structure, when the power supply coil portion and the counter wound coil portion are arranged such that the entirety of the power supply coil portion and the entirety of the counter wound coil portion substantially overlap each other, as viewed in the direction in which the power supply coil portion and the counter wound coil portion face each other, the electric field generated from the power supply coil portion can be more effectively suppressed by the electric field generated from the counter wound coil portion that faces the power supply coil portion in the vicinity of the power supply coil portion. Consequently, the unnecessary radiation based on the electric field generated from the power supply coil portion can be more significantly reduced or prevented.

The aforementioned power supply device according to this aspect preferably further includes a substrate having a surface on which the power supply coil portion and the counter wound coil portion face each other. According to this structure, the substrate helps the power supply coil portion and the counter wound coil portion to easily face each other.

In this case, the power supply coil portion is preferably provided on a first surface of the substrate, and the counter wound coil portion is preferably provided on a second surface of the substrate. According to this structure, the power supply coil portion and the counter wound coil portion can be easily formed on the substrate.

In the aforementioned structure including the substrate, both the power supply coil portion and the counter wound coil portion are preferably provided on the same surface of the substrate. According to this structure, the total thickness of the power supply coil portion and the counter wound coil portion can be reduced as compared with the case where the power supply coil portion and the counter wound coil portion are arranged in different planes, respectively, and hence the size of the power supply device in the thickness direction can be reduced. Furthermore, the power supply coil portion and the counter wound coil portion can be formed from the same surface of the substrate, and hence the power supply coil portion and the counter wound coil portion can be more easily formed as compared with the case where the power supply coil portion and the counter wound coil portion are formed on both surfaces of the substrate, respectively.

In the aforementioned power supply device according to this aspect, the power supply coil portion and the counter wound coil portion preferably include intersection portions that intersect with each other, as viewed in a direction in which the power supply coil portion and the counter wound coil portion face each other.

The aforementioned structure in which the power supply coil portion and the counter wound coil portion include the intersection portions that intersect with each other preferably further includes an insulator that is arranged between the intersection portion of the power supply coil portion and the intersection portion of the counter wound coil portion and insulates the power supply coil portion and the counter wound coil portion from each other. According to this structure, even when the power supply coil portion and the counter wound coil portion are arranged close to each other, conduction of the power supply coil portion and the counter wound coil portion can be prevented by the insulator.

In the aforementioned structure in which the power supply coil portion and the counter wound coil portion include the intersection portions that intersect with each other, the power supply coil portion and the counter wound coil portion each preferably include a plurality of intersection portions, and are preferably line-symmetrical about a line passing through the plurality of intersection portions, as viewed in the direction in which the power supply coil portion and the counter wound coil portion face each other. According to this structure, the power supply coil portion and the counter wound coil portion are line-symmetrical, and hence the power supply coil portion and the counter wound coil portion can be arranged such that the electric field generated from the power supply coil portion is efficiently suppressed by the electric field generated from the counter wound coil portion.

In the aforementioned power supply device according to this aspect, the second end of the power supply coil portion and the second end of the counter wound coil portion are preferably connected to each other, and are preferably connected to ground by a common wire. According to this structure, the number of components can be reduced as compared with the case where the same are connected to ground by different wires from each other. Consequently, the structure of the device can be simplified.

The aforementioned power supply device according to this aspect preferably further includes an installation portion on which a receiver to which power is to be supplied is placed, and the counter wound coil portion is preferably arranged at a side opposite a side at which the installation portion is arranged with respect to the power supply coil portion.

According to this structure, an interval between the power supply coil portion and the receiver (power receiving coil) can be reduced as compared with the case where the counter wound coil portion is arranged between the power supply coil portion and the power receiving coil (a coil that the receiver has), and hence the unnecessary radiation based on the electric field generated from the power supply coil portion can be significantly reduced or prevented without reducing the power supply efficiency of the power supply device.

In this case, a distance between the power supply coil portion and the counter wound coil portion is preferably smaller than a distance between the installation portion and the power supply coil portion. According to this structure, the counter wound coil portion is arranged closer to the power supply device than the receiver placed on the installation portion, and hence power can be supplied to the receiver while the unnecessary radiation to the receiver can be effectively significantly reduced or prevented.

In the aforementioned power supply device according to this aspect, the outer shapes of both the power supply coil portion and the counter wound coil portion are preferably substantially circular, as viewed in a direction in which the power supply coil portion and the counter wound coil portion face each other. According to this structure, the winding axis of the power supply coil portion and the winding axis of the counter wound coil portion are aligned with each other, whereby the power supply coil portion and the counter wound coil portion can easily face each other such that the electric field generated from the power supply coil portion can be suppressed by the electric field generated from the counter wound coil portion, as compared with a coil having a polygonal shape such as a rectangular shape.

In the aforementioned power supply device according to this aspect, the outer shapes of both the power supply coil portion and the counter wound coil portion are preferably substantially rectangular, as viewed in a direction in which the power supply coil portion and the counter wound coil portion face each other. According to this structure, linear portions that the power supply coil portion and the counter wound coil portion include can easily overlap each other, as viewed in the direction in which the power supply coil portion and the counter wound coil portion face each other.

In the aforementioned power supply device according to this aspect, the winding axis of a conductor line of each of the power supply coil portion and the counter wound coil portion preferably extends in the same direction, and the power supply coil portion and the counter wound coil portion preferably face each other in a direction in which the winding axis extends. According to this structure, both the power supply coil portion and the counter wound coil portion are wound in a direction orthogonal to the winding axis, and hence the power supply coil portion and the counter wound coil portion can be arranged in the direction in which the winding axis extends and the power supply coil portion and the counter wound coil portion hardly interfere with each other. In other words, the power supply coil portion and the counter wound coil portion can easily face each other.

In the aforementioned power supply device according to this aspect, the winding axis of a conductor line of each of the power supply coil portion and the counter wound coil portion preferably extends in the same direction, and the power supply coil portion and the counter wound coil portion are preferably aligned in the same plane such that the conductor lines thereof face each other in a direction orthogonal to the winding axis. According to this structure, the power supply coil portion and the counter wound coil portion are aligned in the same plane, and hence the power supply coil portion and the counter wound coil portion can be arranged close to each other. Therefore, the electric field generated from the power supply coil portion can be effectively suppressed by the electric field generated from the counter wound coil portion that faces the power supply coil portion in the vicinity of the power supply coil portion. Consequently, the unnecessary radiation based on the electric field generated from the power supply coil portion can be more significantly reduced or prevented.

In the aforementioned power supply device according to this aspect, the counter wound coil portion is preferably arranged in the vicinity of the power supply coil portion. According to this structure, as compared with the case where the counter wound coil portion is not arranged in the vicinity of the power supply coil portion, the electric field generated from the power supply coil portion can be efficiently suppressed by the electric field generated from the counter wound coil portion that faces the power supply coil portion in the vicinity of the power supply coil portion. Consequently, the unnecessary radiation based on the electric field generated from the power supply coil portion can be more significantly reduced or prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a plan view showing a power supply coil portion and a counter wound coil portion of the power supply device according to the first embodiment of the present invention;

FIG. 4 illustrates induced electromotive force generated, by a first coil, in a second coil that is counter wound and a second coil that is forward wound;

DESCRIPTION OF THE PREFERRED EMBODIMENTS

Figure 1:
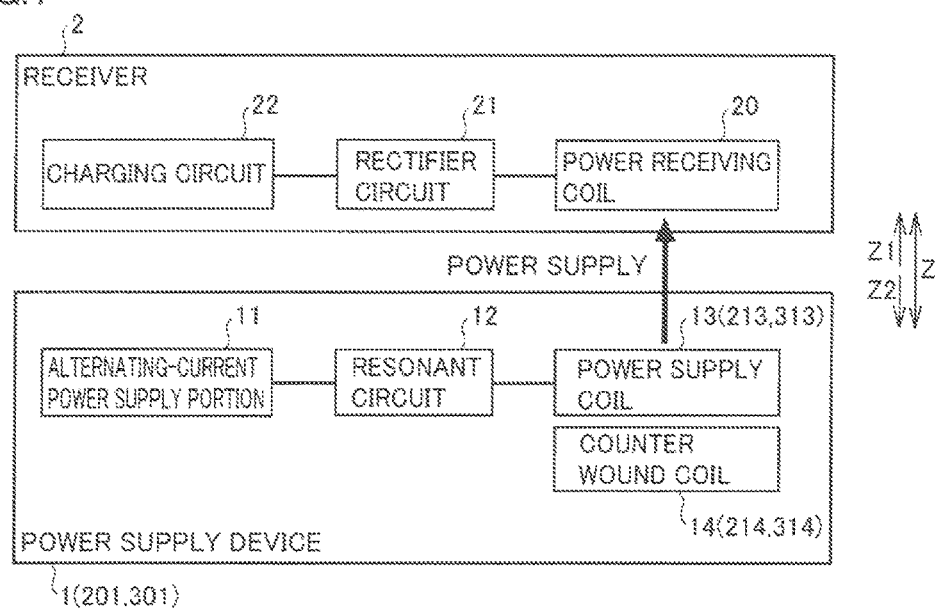
FIG. 1 is a block diagram showing the structure of both a power supply device and a receiver according to a first embodiment of the present invention.

Embodiments of the present invention are now described with reference to the drawings.

First Embodiment

Structure of Power Supply Device

The structure of a power supply device 1 according to a first embodiment of the present invention is now described with reference to FIG. 1.

The power supply device 1 according to the first embodiment of the present invention is a noncontact power supply device that supplies power to a receiver 2 without an electrical contact such as a connector by a magnetic field resonance method. This power supply device 1 is configured to supply power to the receiver 2 arranged above (along arrow Z1) the power supply device 1 by the magnetic field resonance method.

In the following description, a predetermined direction orthogonal to a vertical direction (along arrow Z1 and arrow Z2) is set as a right-left direction (along arrow X2 and arrow X1), and a direction orthogonal to the vertical direction (direction Z) and the right-left direction (direction X) is set as a front-back direction (along arrow Y2 and arrow Y1).

According to the first embodiment, the power supply device 1 is configured to suppress an electric field generated from a power supply coil portion 13, described later, of the power supply device 1 by an electric field generated from a counter wound coil portion 14, described later, of the power supply device 1 when supplying power to the receiver 2. Thus, the power supply device 1 is configured to be capable of significantly reducing or preventing unnecessary radiation generated from the electric field that the power supply coil portion 13 generates. Consequently, the power supply device 1 significantly reduces a possibility that a failure occurs in an electronic device (an electronic device including the power supply device 1 itself and the receiver 2) in the vicinity of the power supply device 1 due to unnecessary radiation, as described in more detail hereinafter.

[Structure of Each Portion of Power Supply Device]

The structure of each portion of the power supply device 1 is now described.

The power supply device 1 includes a housing 10 (see FIG. 2), an alternating-current power supply portion 11, a resonant circuit 12, the power supply coil portion 13, and the counter wound coil portion 14. An air space is arranged between the power supply coil portion 13 and the counter wound coil portion 14. The alternating-current power supply portion 11 is an example of the "power supply portion" in the claims.

Figure 2:
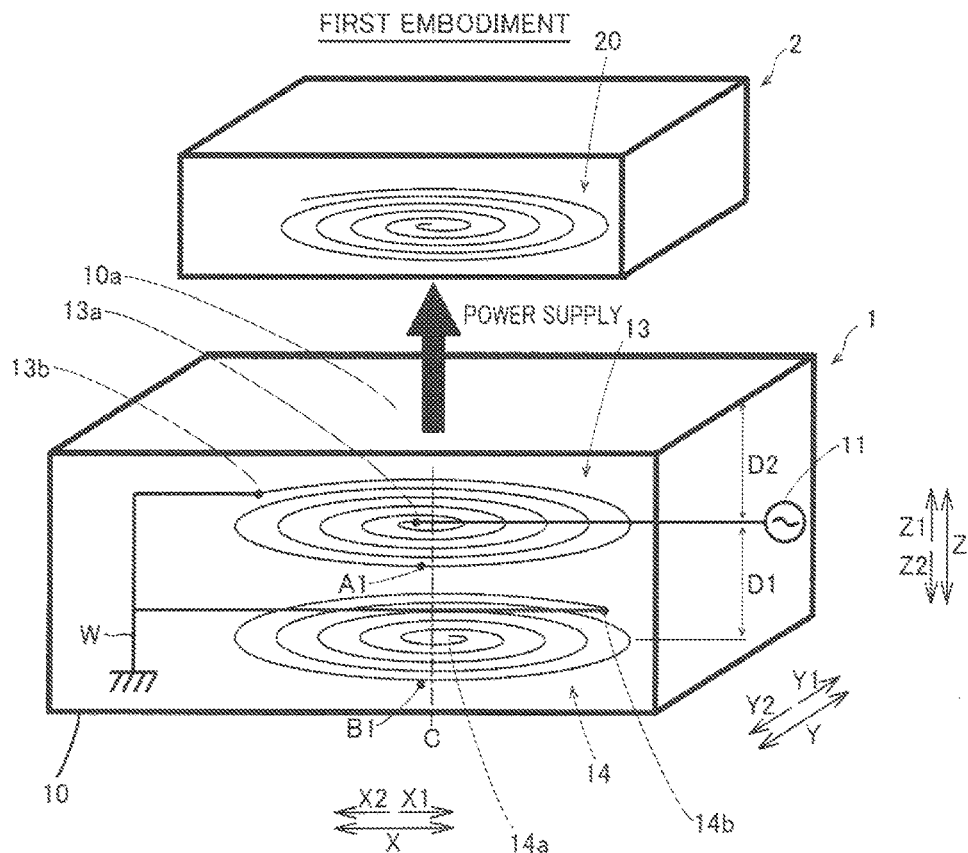
FIG. 2 is a schematic perspective view of the power supply device and the receiver according to the first embodiment of the present invention.

As shown in FIG. 2, the alternating-current power supply portion 11, the resonant circuit 12 (see FIG. 1), the power supply coil portion 13, and the counter wound coil portion 14 are housed inside the housing 10. The receiver 2 is placed on the upper surface 10a of the housing 10 such that power is supplied to the receiver 2. The upper surface 10a is an example of the "installation portion" in the claims.

Alternating-current power is supplied from a commercial power supply (not shown) to the alternating-current power supply portion 11. As shown in FIG. 1, the alternating-current power supply portion 11 is connected to the resonant circuit 12 to supply power to the resonant circuit 12.

The resonant circuit 12 is connected to the power supply coil portion 13. The resonant circuit 12 is configured to turn on and off the power from the alternating-current power supply portion 11 to supply alternating-current power at a predetermined frequency corresponding to the resonant frequency of the power supply coil portion 13 to the power supply coil portion 13.

The alternating-current power at the predetermined frequency is supplied from the resonant circuit 12 to the power supply coil portion 13 so that the power supply coil portion 13 generates a magnetic field to supply power to the receiver 2 without an electrical contact. Thus, the power supply device 1 is configured to supply power to the receiver 2 without an electrical contact.

As shown in FIG. 2, the power supply coil portion 13 is arranged in an upper portion (along arrow Z1) of the housing 10. The power supply coil portion 13 extends in a horizontal direction (directions X and Y) (in a horizontal plane), and has a planar coil shape in which a conductor line is spirally wound.

An inner first end 13a of the power supply coil portion 13 is connected to the alternating-current power supply portion 11. An outer second end 13b of the power supply coil portion 13 is connected to ground. The conductor line of the power supply coil portion 13 is wound in a clockwise direction from the outer second end 13b toward the inner first end 13a in a plan view (as viewed along arrow Z1), as shown in FIG. 3. Power is supplied from the alternating-current power supply portion 11 (see FIG. 2) to the power supply coil portion 13 so that an electric field is generated around the conductor line forming the power supply coil portion 13. In FIG. 3, the power supply coil portion 13 is shown by a solid line, and the counter wound coil portion 14 is shown by a broken line for the convenience of illustration. Furthermore, the power supply coil portion 13 and the counter wound coil portion 14 are shown slightly deviated from each other not to overlap each other in FIG. 3 for the convenience of illustration. Although a line connected from the alternating-current power supply portion 11 to the inner first end 13a shown in FIG. 2 (similarly in FIGS. 6 to 9) is shown as being in contact with the spiral coil, the line is actually coated, and the coil and the line connecting the inner first end 13a and the alternating-current power supply portion 11 do not make a short circuit.

The counter wound coil portion 14 has the same planar coil shape as the power supply coil portion 13, as shown in FIG. 2. More specifically, the counter wound coil portion 14 extends in the horizontal direction (in the horizontal plane), and has the planar coil shape in which a conductor line is spirally wound.

An inner first end 14a of the counter wound coil portion 14 is opened (not electrically connected). An outer second end 14b of the counter wound coil portion 14 is connected to ground. The conductor line of the counter wound coil portion 14 is wound in a counterclockwise direction from the outer second end 14b toward the inner first end 14a in a plan view (as viewed along arrow Z1), as shown in FIG. 3. More specifically, the winding direction of the counter wound coil portion 14 is opposite to the winding direction of the power supply coil portion 13.

The counter wound coil portion 14 faces the power supply coil portion 13 in the vertical direction (direction Z). The counter wound coil portion 14 is arranged at a side (lower side) opposite a side (upper side) at which the receiver 2 to which power is to be supplied is arranged. More specifically, the counter wound coil portion 14 is not positioned between the power supply coil portion 13 and the receiver 2 but is positioned further away from the receiver 2 than the power supply coil portion 13. Furthermore, the counter wound coil portion 14 is arranged on a space parallel to a space in which the power supply coil portion 13 is arranged. More specifically, the counter wound coil portion 14 faces the power supply coil portion 13 in a parallel fashion. The counter wound coil portion 14 is arranged with respect to the power supply coil portion 13 to cancel out the electric field that the power supply coil portion 13 generates. Details are described later. The outer shapes of both the counter wound coil portion 14 and the power supply coil portion 13 are substantially circular, as viewed in a direction (direction Z) in which the counter wound coil portion 14 and the power supply coil portion 13 face each other. The counter wound coil portion 14 and the power supply coil portion 13 have the same size, as viewed in the direction (direction Z) in which the counter wound coil portion 14 and the power supply coil portion 13 face each other.

As shown in FIG. 2, the second end 14b of the counter wound coil portion 14 and the second end 13b of the power supply coil portion 13 are connected to each other, and are connected to ground by a common wire W. The counter wound coil portion 14 is arranged in the vicinity of the power supply coil portion 13. Specifically, a distance D1 between the counter wound coil portion 14 and the power supply coil portion 13 is smaller than a distance D2 between the upper surface 10a and the power supply coil portion 13.

The counter wound coil portion 14 is arranged such that the winding center (line) C thereof (the centerline of counter wound coil portion 14 extending in the direction Z) coincides with the winding center (line) of the power supply coil portion 13 in a plan view, as shown in FIG. 3. In other words, the counter wound coil portion 14 and the power supply coil portion 13 are spirally wound in opposite directions to each other about the single common winding center C in a plan view (as viewed along arrow Z1). More specifically, the winding center of each of the counter wound coil portion 14 and the power supply coil portion 13 extends in the same direction (direction Z). The counter wound coil portion 14 and the power supply coil portion 13 face each other in a direction (direction Z) in which the winding center C extends. The winding center C is an example of the "winding axis" in the claims.

The counter wound coil portion 14 is shaped to be line-symmetrical (a portion along arrow X1 and a portion along arrow X2 are symmetrical) with respect to the power supply coil portion 13 about a line α extending in a front-back direction (direction Y) through the winding center C in a plan view (as viewed along arrow Z1).

In other words, the power supply coil portion 13 and the counter wound coil portion 14 include intersection portions 4a and 4b that intersect with each other, respectively, as viewed in the direction (direction Z) in which the power supply coil portion 13 and the counter wound coil portion 14 face each other. A plurality of intersection portions 4a and a plurality of intersection portions 4b are provided. The power supply coil portion 13 and the counter wound coil portion 14 are line-symmetrical about the line α passing through the intersection portions 4a and 4b, as viewed in the direction (direction Z) in which the counter wound coil portion 14 and the power supply coil portion 13 face each other.

In the vertical direction (direction Z), the conductor lines of the power supply coil portion 13 and the counter wound coil portion 14 are wound in the same shape and have portions that overlap each other (winding portions 13c to 13g and winding portions 14c to 14g).

More specifically, the conductor line of the counter wound coil portion 14 is spirally wound to face the winding portions 13c to 13g of the conductor line of the power supply coil portion 13 in the vertical direction (direction Z).

In an outermost peripheral portion of the conductor line of the power supply coil portion 13, an arcuate (C-shaped) winding portion 13c (a solid line portion surrounded by a two-dot chain line) facing the conductor line of the counter wound coil portion 14 in a plan view (as viewed along arrow Z1) is provided. Similarly, in an outermost peripheral portion of the conductor line of the counter wound coil portion 14, an arcuate (C-shaped) winding portion 14c (a broken line portion surrounded by the two-dot chain line) facing the conductor line (winding portion 13c) of the power supply coil portion 13 in a plan view (as viewed along arrow Z1) is provided.

Also at an inner peripheral side with respect to the outermost peripheral portion (winding portion 13c) of the conductor line of the power supply coil portion 13, arcuate (C-shaped) winding portions 13d to 13g that face the conductor line of the counter wound coil portion 14 are provided. Similarly, also at an inner peripheral side with respect to the outermost peripheral portion (winding portion 14c) of the conductor line of the counter wound coil portion 14, arcuate (C-shaped) winding portions 14d to 14g that face the conductor line (winding portions 13d to 13g) of the power supply coil portion 13 are provided.

[Structure of Receiver]

The receiver 2 includes a power receiving coil 20, a rectifier circuit 21, and a charging circuit 22, as shown in FIG. 1.

The power receiving coil 20 is configured to resonate at substantially the same resonant frequency as the resonant frequency of the power supply coil portion 13. The power receiving coil 20 is configured to generate alternating-current power (receive power) by resonating by the magnetic field resonance method. Furthermore, the power receiving coil 20 is configured to output the generated alternating-current power to the rectifier circuit 21.

The rectifier circuit 21 is configured to rectify the alternating-current power generated in the power receiving coil 20 to direct-current power. The rectifier circuit 21 is configured to output the rectified direct-current power to the charging circuit 22.

The charging circuit 22 includes a voltage converter and a battery. The voltage converter is configured to convert the direct-current power input from the rectifier circuit 21 into a predetermined voltage value in order to supply power to the battery. The battery is charged by power supply from the voltage converter.

[Voltage Induced in Second Coil]

A voltage induced in a second coil that faces a first coil 91 is now described with reference to FIG. 4. A second coil 92a wound in a counter direction (counter wound) to that of the first coil 91 and a second coil 92b wound in the same direction (forward wound) as that of the first coil 91 are described here in a comparative manner. It is assumed that a first end of the first coil 91 is connected to an alternating-current power supply portion, and a second end of the first coil 91 is connected to ground. Furthermore, it is assumed that first ends of the second coils 92a and 92b are opened, and second ends of the second coils 92a and 92b are connected to ground. In addition, it is assumed that the first coil 91 and the second coils 92a and 92b have the same shape (winding portions of conductor lines have the same shape).

View (a) of FIG. 4 illustrates an example corresponding to the first embodiment. More specifically, view (a) of FIG. 4 illustrates the example (counter winding example) in which the winding directions of the conductor lines of the first coil 91 and the second coil 92a are opposite to each other.

When alternating-current power is supplied from the alternating-current power supply portion to the first coil 91, a voltage of E is generated in the first coil 91. Induced electromotive force of −E is generated in the second coil 92a by a magnetic field generated around the first coil 91. Actually, voltages in winding portions of the first coil 91 (second coil 92a) are different from each other, but one voltage value is shown for the convenience of illustration.

The first end of the second coil 92a is opened, and hence no current flows. In other words, even if the induced electromotive force is generated by the magnetic field generated around the first coil 91, no energy loss (eddy-current loss) is generated.

Therefore, if the conductor lines of the first coil 91 and the second coil 92a are wound counter to each other, voltages equal in magnitude to each other but opposite in sign to each other are generated in the first coil 91 and the second coil 92a.

View (b) of FIG. 4 illustrates an example (forward winding example) in which the winding directions of the conductor lines of the first coil 91 and the second coil 92b are the same as each other as a comparative example.

When alternating-current power is supplied from the alternating-current power supply portion to the first coil 91, a voltage of E is generated in the first coil 91. Induced electromotive force of E is generated in the second coil 92b by a magnetic field generated around the first coil 91.

Therefore, if the conductor lines of the first coil 91 and the second coil 92b are wound in the same direction as each other (forward wound), voltages equal in magnitude to each other and equal in sign to each other are generated in the first coil 91 and the second coil 92b.

[Suppression of Electric Field]

Suppression, by the counter wound coil portion 14, of an electric field generated by the power supply coil portion 13 is now described with reference to FIGS. 2, 3, and 5.

Firstly, suppression of an electric field in the winding portion 13c (see FIG. 3) of the conductor line of the power supply coil portion 13 and the winding portion 14c (see FIG. 3) of the conductor line of the counter wound coil portion 14 is described.

Figure 5:
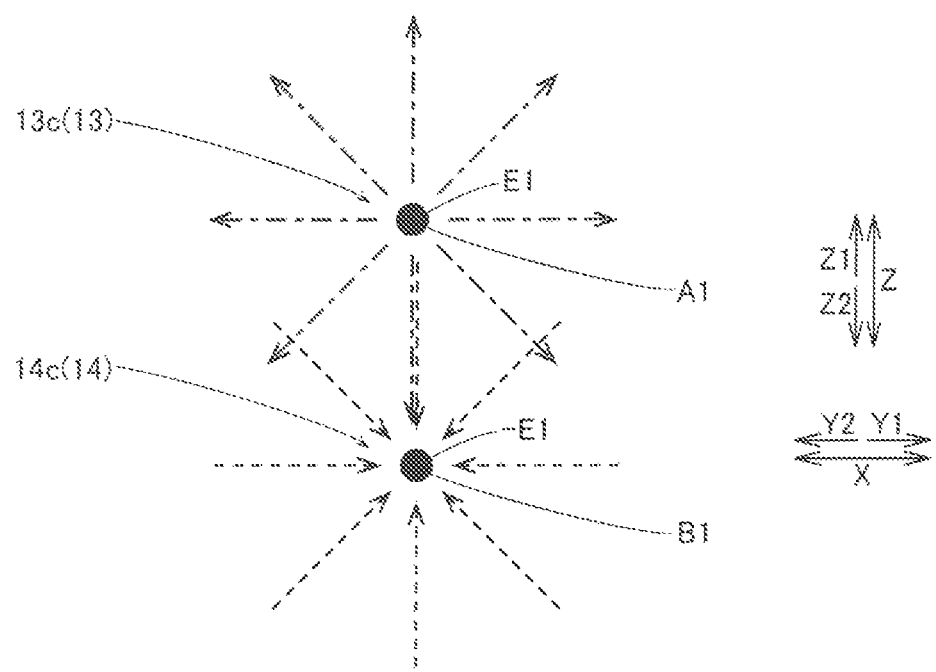
FIG. 5 illustrates suppression, by an electric field of the counter wound coil portion, of an electric field of the power supply coil portion.

A voltage of E1 is locally generated in the vicinity of a point A1 on the winding portion 13c, as shown in FIG. 5. At this time, a voltage of −E1 is locally induced in the vicinity of a point B1 on the winding portion 14c, which faces the point A1, in the vertical direction (direction Z).

The voltage E1 generates an electric field radially outward from the point A1. The voltage −E1 generates an electric field radially inward to the point B1. The electric field at the point A1 and the electric field at the point B1 have the same number of electric field components (arrow components shown by broken lines and one-dot chain lines in FIG. 5) opposite in direction to each other and substantially equal in magnitude to each other, and hence the electric field at the point A1 and the electric field at the point B1 suppress each other. Therefore, an electric field obtained by combining the electric field at the point A1 and the electric field at the point B1 is substantially zero. Thus, electric fields are suppressed (combined electric fields are substantially zero) similarly in entire areas of the winding portion 13c of the power supply coil portion 13 and the winding portion 14c of the counter wound coil portion 14.

Similarly, electric fields are suppressed (combined electric fields are substantially zero) in the winding portions 13d to 13g of the power supply coil portion 13 at the inner peripheral side with respect to the winding portion 13c and in the winding portions 14d to 14g of the counter wound coil portion 14 at the inner peripheral side with respect to the winding portion 14c.

(Effects of First Embodiment)

According to the first embodiment, the following effects can be obtained.

According to the first embodiment, as hereinabove described, the power supply device 1 includes the power supply coil portion 13 having the first end 13a connected to the alternating-current power supply portion 11 and the second end 13b connected to ground and the counter wound coil portion 14 that faces the power supply coil portion 13, the winding direction of which is opposite to that of the power supply coil portion 13, and the counter wound coil portion 14 has the opened first end 14a and the second end 14b connected to ground. Thus, the second end 14b of the counter wound coil portion 14 as well as the second end 13b of the power supply coil portion 13 is connected to ground, whereby induced electromotive force opposite to induced electromotive force in the power supply coil portion 13 can be induced in the counter wound coil portion 14 by a voltage applied to the power supply coil portion 13 while the second end 14b of the counter wound coil portion 14 and the second end 13b of the power supply coil portion 13 are equipotential. Therefore, the electric field generated from the power supply coil portion 13 can be suppressed by the electric field generated from the counter wound coil portion 14 that faces the power supply coil portion 13. Consequently, unnecessary radiation based on the electric field generated from the power supply coil portion 13 can be significantly reduced or prevented. As the counter wound coil portion 14 is brought closer to the power supply coil portion 13, unnecessary radiation can be more significantly reduced.

According to the first embodiment, as hereinabove described, each of the power supply coil portion 13 and the counter wound coil portion 14 has the planar coil shape in which the conductor line is spirally wound in the horizontal plane. Thus, the thicknesses of the power supply coil portion 13 and the counter wound coil portion 14 can be reduced, and hence the size of the power supply device 1 in a thickness direction can be reduced. Furthermore, when the power supply coil portion 13 and the counter wound coil portion 14 face each other, the power supply coil portion 13 and the counter wound coil portion 14 can overlap each other in a relatively large range in a plan view, and hence the electric field generated from the power supply coil portion 13 can be more effectively suppressed by the electric field generated from the counter wound coil portion 14. Consequently, the unnecessary radiation based on the electric field generated from the power supply coil portion 13 can be more significantly reduced or prevented.

According to the first embodiment, as hereinabove described, the power supply coil 13 and the counter wound coil 14 are arranged such that planes in which the power supply coil 13 and the counter wound coil 14 exist respectively face each other, and in the direction in which the power supply coil portion 13 and the counter wound coil portion 14 face each other, the conductor lines thereof are wound in the same shape and have the portions that overlap each other (the winding portions 13c to 13g of the power supply coil portion 13 and the winding portions 14c to 14g of the counter wound coil portion 14). Thus, a reverse voltage can be locally induced in each of the winding portions 14c to 14g of the counter wound coil portion 14 corresponding to the winding portions 13c to 13g of the power supply coil portion 13. Thus, the electric field generated from the power supply coil portion 13 can be suppressed by the electric field generated from the counter wound coil portion 14 over a substantially entire portion of the power supply coil portion 13. Consequently, the unnecessary radiation based on the electric field generated from the power supply coil portion 13 can be still more significantly reduced or prevented.

According to the first embodiment, as hereinabove described, the conductor line of the counter wound coil portion 14 has substantially the same winding shape as that of the conductor line of the power supply coil portion 13 and faces the conductor line of the power supply coil portion 13, and the counter wound coil portion 14 is arranged such that the winding center C of the counter wound coil portion 14 substantially coincides with the winding center of the power supply coil portion 13 in a plan view. Thus, the counter wound coil portion 14 and the power supply coil portion 13 can be arranged closer to each other as compared with the case where the winding center C of the counter wound coil portion 14 does not substantially coincide with (is deviated from) the winding center of the power supply coil portion 13 in a plan view, and hence the unnecessary radiation based on the electric field generated from the power supply coil portion 13 can be more significantly reduced or prevented.

According to the first embodiment, the counter wound coil portion 14 is arranged with respect to the power supply coil portion 13 to cancel out the electric field that the power supply coil portion 13 generates. Thus, the unnecessary radiation based on the electric field generated from the power supply coil portion 13 can be effectively significantly reduced or prevented.

According to the first embodiment, the power supply coil portion 13 and the counter wound coil portion 14 have the same size, as viewed in the direction in which the power supply coil portion 13 and the counter wound coil portion 14 face each other. Thus, when the power supply coil portion 13 and the counter wound coil portion 14 are arranged such that the entirety of the power supply coil portion 13 and the entirety of the counter wound coil portion 14 overlap each other, as viewed in the direction in which the power supply coil portion 13 and the counter wound coil portion 14 face each other, the electric field generated from the power supply coil portion 13 can be more effectively suppressed by the electric field generated from the counter wound coil portion 14 that faces the power supply coil portion 13 in the vicinity of the power supply coil portion 13. Consequently, the unnecessary radiation based on the electric field generated from the power supply coil portion 13 can be more significantly reduced or prevented.

According to the first embodiment, the plurality of intersection portions 4a and the plurality of intersection portions 4b are provided in the power supply coil portion 13 and the counter wound coil portion 14, respectively, and the power supply coil portion 13 and the counter wound coil portion 14 are line-symmetrical about the line α passing through the plurality of intersection portions 4a and the plurality of intersection portions 4b, as viewed in the direction in which the power supply coil portion 13 and the counter wound coil portion 14 face each other. Thus, the power supply coil portion 13 and the counter wound coil portion 14 are line-symmetrical, and hence the power supply coil portion 13 and the counter wound coil portion 14 can be arranged such that the electric field generated from the power supply coil portion 13 is efficiently suppressed by the electric field generated from the counter wound coil portion 14.

According to the first embodiment, the second end 13b of the power supply coil portion 13 and the second end 14b of the counter wound coil portion 14 are connected to each other, and are connected to ground by the common wire W. Thus, the number of components can be reduced as compared with the case where the same are connected to ground by different wires W from each other. Consequently, the structure of the device can be simplified.

According to the first embodiment, as hereinabove described, the power supply device 1 further includes the upper surface 10a on which the receiver 2 to which power is to be supplied is placed, and the counter wound coil portion 14 is arranged at a side opposite a side at which the upper surface 10a is arranged with respect to the power supply coil portion 13. Thus, an interval between the power supply coil portion 13 and the receiver 2 (power receiving coil 20) can be reduced as compared with the case where the counter wound coil portion 14 is arranged between the power supply coil portion 13 and the power receiving coil 20, and hence the unnecessary radiation based on the electric field generated from the power supply coil portion 13 can be significantly reduced or prevented without reducing the power supply efficiency of the power supply device 1.

According to the first embodiment, the distance D1 between the power supply coil portion 13 and the counter wound coil portion 14 is smaller than the distance D2 between the upper surface 10a and the power supply coil portion 13. Thus, the counter wound coil portion 14 is arranged closer to the power supply device 1 than the receiver 2 placed on the upper surface 10a, and hence power can be supplied to the receiver 2 while the unnecessary radiation to the receiver 2 can be effectively significantly reduced or prevented.

According to the first embodiment, the outer shapes of both the power supply coil portion 13 and the counter wound coil portion 14 are circular, as viewed in the direction in which the power supply coil portion 13 and the counter wound coil portion 14 face each other. Thus, the winding center of the power supply coil portion 13 and the winding center of the counter wound coil portion 14 are aligned with each other, whereby the power supply coil portion 13 and the counter wound coil portion 14 can easily face each other such that the electric field generated from the power supply coil portion 13 can be suppressed by the electric field generated from the counter wound coil portion 14, as compared with a coil having a polygonal shape such as a rectangular shape.

According to the first embodiment, the winding centers C of the conductor lines of both the power supply coil portion 13 and the counter wound coil portion 14 extend in the same direction, and the power supply coil portion 13 and the counter wound coil portion 14 face each other in the direction in which the winding centers C extend. Thus, both the power supply coil portion 13 and the counter wound coil portion 14 are wound in a direction orthogonal to the winding centers C, and hence the power supply coil portion 13 and the counter wound coil portion 14 can be arranged in the direction in which the winding centers C extend and the power supply coil portion 13 and the counter wound coil portion 14 hardly interfere with each other. In other words, the power supply coil portion 13 and the counter wound coil portion 14 can easily face each other.

According to the first embodiment, the counter wound coil portion 14 is arranged in the vicinity of the power supply coil portion 13. Thus, as compared with the case where the counter wound coil portion 14 is not arranged in the vicinity of the power supply coil portion 13, the electric field generated from the power supply coil portion 13 can be efficiently suppressed by the electric field generated from the counter wound coil portion 14 that faces the power supply coil portion 13 in the vicinity of the power supply coil portion 13. Consequently, the unnecessary radiation based on the electric field generated from the power supply coil portion 13 can be more significantly reduced or prevented.

Second Embodiment

A second embodiment is now described with reference to FIGS. 1, 6, and 7. In this second embodiment, a printed board 3 is arranged between a power supply coil portion 213 and a counter wound coil portion 214 (the power supply coil portion 213 and the counter wound coil portion 214 are arranged on a first surface and a second surface of the printed board, respectively), unlike the aforementioned first embodiment in which the air space is arranged between the power supply coil portion 13 and the counter wound coil portion 14. Portions of a power supply device 201 similar to those of the power supply device 1 according to the aforementioned first embodiment are denoted by the same reference numerals, to omit the description. The printed board 3 is an example of the "substrate" in the claims.

[Structure of Power Supply Device]

Figure 6:
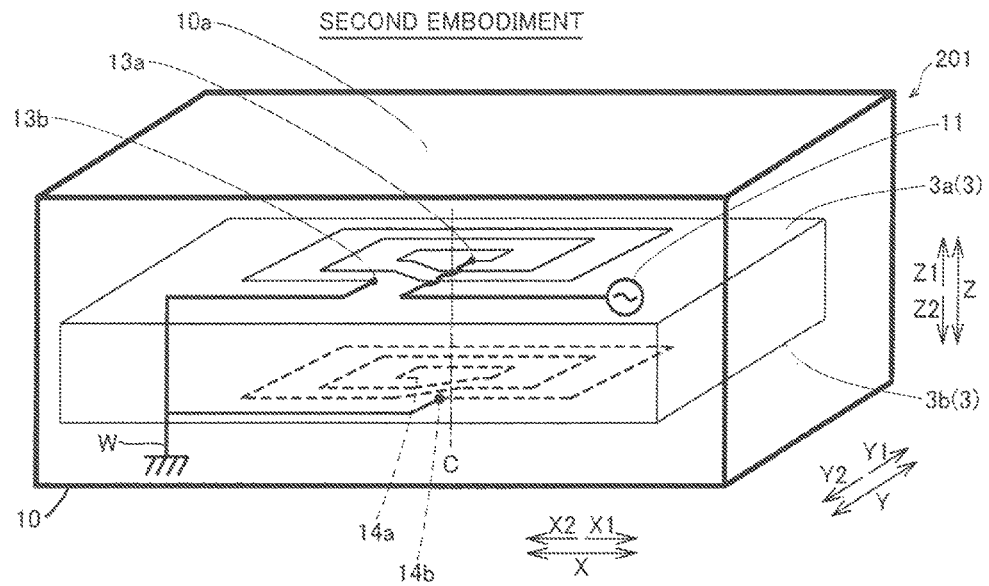
FIG. 6 is a schematic perspective view of a power supply device according to a second embodiment of the present invention.
Figure 7:
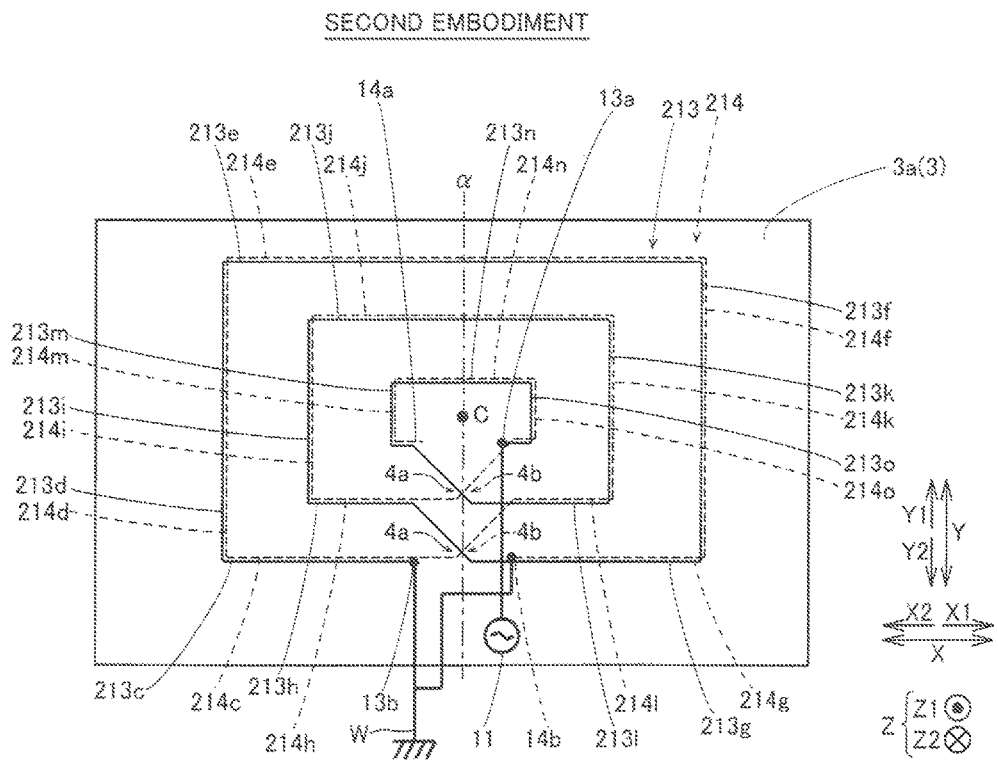
FIG. 7 is a plan view showing a printed circuit board provided with a power supply coil portion and a counter wound coil portion of the power supply device according to the second embodiment of the present invention.

The power supply device 201 (see FIG. 1) according to the second embodiment of the present invention includes the printed board 3, the power supply coil portion 213, and the counter wound coil portion 214, as shown in FIG. 6. The printed board 3 extending in a horizontal direction (directions X and Y) is arranged inside a housing 10. On the outer surface of the printed board 3, the power supply coil portion 213 and the counter wound coil portion 214 face each other. The power supply coil portion 213 is arranged on an upper (along arrow Z1) first surface 3a of the printed board 3. The counter wound coil portion 214 is arranged on a lower (along arrow Z2) second surface 3b of the printed board 3. The outer shapes of both the power supply coil portion 213 and the counter wound coil portion 214 are substantially rectangular, as viewed in a direction (direction Z) in which the power supply coil portion 213 and the counter wound coil portion 214 face each other.

The power supply coil portion 213 has a planar coil shape in which a conductor line is rectangularly and spirally wound on the first surface 3a. As shown in FIG. 7, the power supply coil portion 213 is provided with linear winding portions 213c to 213o of the conductor line.

The counter wound coil portion 214 has the same shape as that of the power supply coil portion 213. The counter wound coil portion 214 is provided with the winding portions 214c to 214o that face the winding portions 213c to 213o of the power supply coil portion 213, respectively, in a vertical direction (direction Z). The winding portions 214c to 214o of the counter wound coil portion 214 suppress electric fields generated by the winding portions 213c to 213o of the power supply coil portion 213, respectively.

(Effects of Second Embodiment)

According to the second embodiment, the following effects can be obtained.

According to the second embodiment, the power supply device 201 includes the power supply coil portion 213 having a first end 13a connected to an alternating-current power supply portion 11 and a second end 13b connected to ground and the counter wound coil portion 214 that faces the power supply coil portion 213, the winding direction of which is opposite to that of the power supply coil portion 213, a first end 14a of the counter wound coil portion 214 is opened, and a second end 14b of the counter wound coil portion 214 is connected to ground, similarly to the aforementioned first embodiment. Thus, unnecessary radiation based on the electric field generated from the power supply coil portion 213 can be significantly reduced or prevented.

According to the second embodiment, the printed board 3 having the outer surface on which the power supply coil portion 213 and the counter wound coil portion 214 face each other is provided. Thus, the printed board 3 helps the power supply coil portion 213 and the counter wound coil portion 214 to easily face each other.

According to the second embodiment, as hereinabove described, the power supply coil portion 213 is arranged on the first surface 3a of the printed board 3, and the counter wound coil portion 214 is arranged on the second surface 3b of the printed board 3. Thus, the power supply coil portion 213 and the counter wound coil portion 214 can be easily formed on the printed board 3.

According to the second embodiment, the outer shapes of both the power supply coil portion 213 and the counter wound coil portion 214 are rectangular, as viewed in the direction in which the power supply coil portion 213 and the counter wound coil portion 214 face each other. Thus, linear portions that the power supply coil portion 213 and the counter wound coil portion 214 include can easily overlap each other, as viewed in the direction in which the power supply coil portion 213 and the counter wound coil portion 214 face each other.

Third Embodiment

Figure 8:
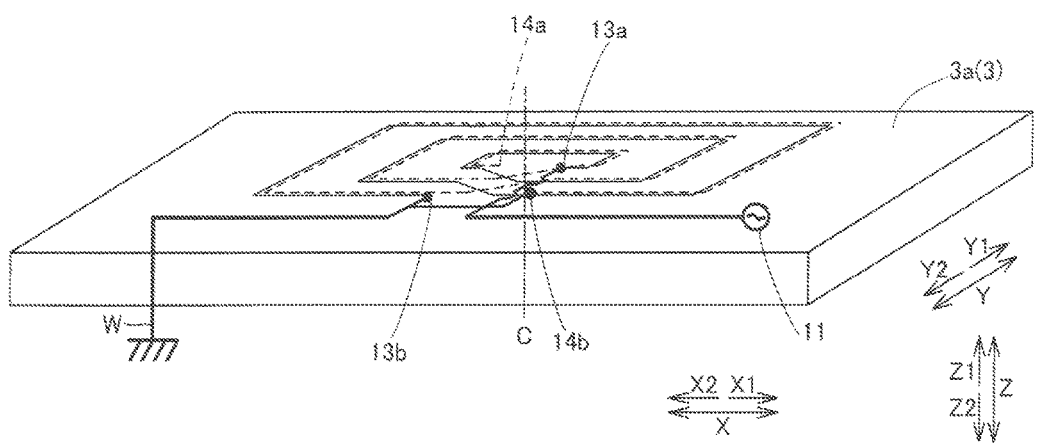
FIG. 8 is a schematic perspective view of a power supply device according to a third embodiment of the present invention.
Figure 9:
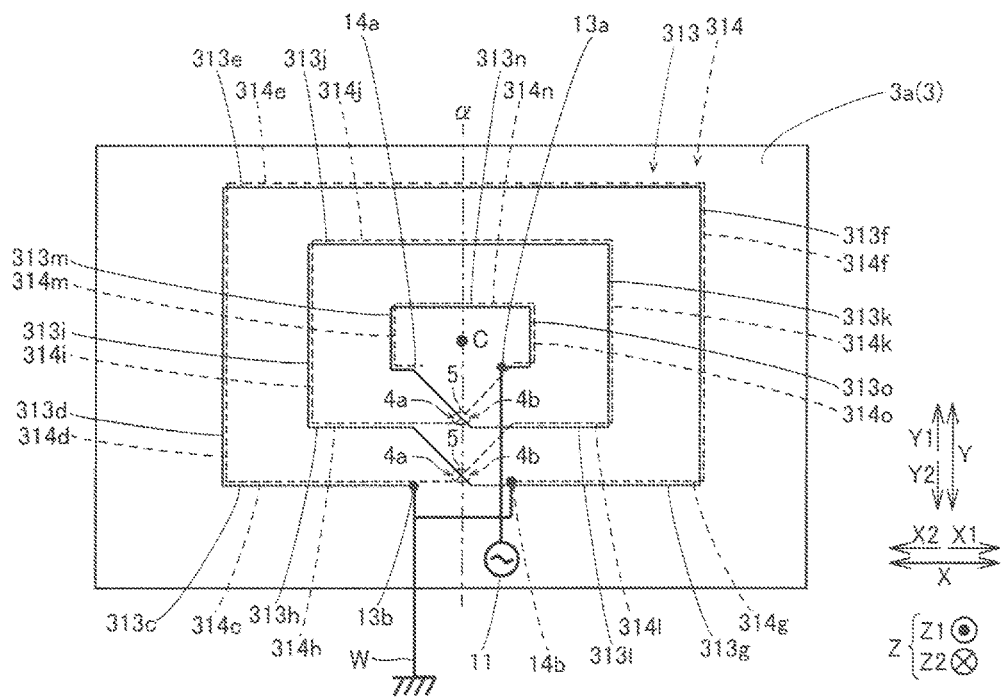
FIG. 9 is a plan view showing a printed circuit board provided with a power supply coil portion and a counter wound coil portion of the power supply device according to the third embodiment of the present invention.

A third embodiment is now described with reference to FIGS. 1, 8, and 9. In this third embodiment, a power supply coil portion 313 and a counter wound coil portion 314 are arranged in the same plane, unlike the aforementioned second embodiment in which the power supply coil portion 213 and the counter wound coil portion 214 that are separate from each other in a predetermined direction (vertical direction) face each other (are arranged in different planes). Portions of a power supply device 301 similar to those of the power supply device 201 according to the aforementioned second embodiment are denoted by the same reference numerals, to omit the description. In FIGS. 8 and 9, the counter wound coil portion 314 is shown by broken lines to distinguish it from the power supply coil portion 313.

[Structure of Power Supply Device]

The power supply device 301 (see FIG. 1) according to the third embodiment of the present invention further includes a printed board 3, as shown in FIG. 8. The printed board 3 extending in a horizontal direction (directions X and Y) is arranged inside a housing 10.

Both the power supply coil portion 313 and the counter wound coil portion 314 are provided on the same surface 3a of the printed board 3. More specifically, each of the power supply coil portion 313 and the counter wound coil portion 314 has a planar coil shape in which a conductor line is rectangularly and spirally wound on the upper (along arrow Z1) surface 3a of the printed board 3.

As shown in FIG. 9, the power supply coil portion 313 and the counter wound coil portion 314 are arranged such that winding portions 313c to 313o and winding portions 314c to 314o of respective conductor lines thereof closely face each other in substantially the same plane (are slightly deviated from each other in the vertical direction (direction Z)). In other words, the power supply coil portion 313 and the counter wound coil portion 314 are arranged in the same plane such that the conductor lines thereof face each other in a direction orthogonal to winding centers C (a direction orthogonal to the direction Z).

In the power supply coil portion 313 and the counter wound coil portion 314, insulators 5 are arranged in portions where the power supply coil portion 313 and the counter wound coil portion 314 intersect with each other (between the conductor lines of the power supply coil portion 313 and the counter wound coil portion 314). Specifically, the insulators 5 are arranged between intersection portions 4a of the power supply coil portion 313 and intersection portions 4b of the counter wound coil portion 314, and insulate the power supply coil portion 313 and the counter wound coil portion 314 from each other. The insulators 5 are made of an insulating material such as rubber. In FIG. 8, illustration of the insulators 5 are omitted.

(Effects of Third Embodiment)

According to the third embodiment, the following effects can be obtained.

According to the third embodiment, the power supply device 301 includes the power supply coil portion 313 having a first end 13a connected to an alternating-current power supply portion 11 and a second end 13b connected to ground and the counter wound coil portion 314 that faces the power supply coil portion 313, the winding direction of which is opposite to that of the power supply coil portion 313, a first end 14a of the counter wound coil portion 314 is opened, and a second end 14b of the counter wound coil portion 314 is connected to ground, similarly to the aforementioned second embodiment. Thus, unnecessary radiation based on an electric field generated from the power supply coil portion 313 can be significantly reduced or prevented.

According to the third embodiment, as hereinabove described, both the power supply coil portion 313 and the counter wound coil portion 314 are arranged on the same surface 3a of the printed board 3. Thus, the total thickness of the power supply coil portion 313 and the counter wound coil portion 314 can be reduced as compared with the case where the power supply coil portion 313 and the counter wound coil portion 314 are arranged in different planes, respectively, and hence the size of the power supply device 301 in a thickness direction can be reduced. Furthermore, the power supply coil portion 313 and the counter wound coil portion 314 can be formed from the same surface 3a of the printed board 3, and hence the power supply coil portion 313 and the counter wound coil portion 314 can be more easily formed as compared with the case where the power supply coil portion 313 and the counter wound coil portion 314 are formed on both surfaces of the printed board 3, respectively.

According to the third embodiment, the insulators 5 that are arranged between the intersection portions 4a of the power supply coil portion 313 and the intersection portions 4b of the counter wound coil portion 314 and insulate the power supply coil portion 313 and the counter wound coil portion 314 from each other are provided. Thus, even when the power supply coil portion 313 and the counter wound coil portion 314 are arranged close to each other, conduction of the power supply coil portion 313 and the counter wound coil portion 314 can be prevented by the insulators 5.

According to the third embodiment, the winding centers C of the conductor lines of the power supply coil portion 313 and the counter wound coil portion 314 extend in the same direction, and the power supply coil portion 313 and the counter wound coil portion 314 are aligned in the same plane such that the conductor lines thereof face each other in the direction orthogonal to the winding centers C. Thus, the power supply coil portion 313 and the counter wound coil portion 314 are aligned in the same plane, and hence the power supply coil portion 313 and the counter wound coil portion 314 can be arranged close to each other. Therefore, the electric field generated from the power supply coil portion 313 can be effectively suppressed by an electric field generated from the counter wound coil portion 314 that faces the power supply coil portion 313 in the vicinity of the power supply coil portion 313. Consequently, the unnecessary radiation based on the electric field generated from the power supply coil portion 313 can be more significantly reduced or prevented.

[Modification]

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while power is supplied from the power supply device to the receiver by the magnetic field resonance method in each of the aforementioned first to third embodiments, the present invention is not restricted to this. According to the present invention, power may alternatively be supplied from the power supply device to the receiver by a method other than the magnetic field resonance method. Power may be supplied from the power supply device to the receiver by a method such as an electric field coupling method, an electromagnetic induction method, or a radio wave method, for example.

While the power supply coil portion (counter wound coil portion) has the planar coil shape in each of the aforementioned first to third embodiments, the present invention is not restricted to this. According to the present invention, the power supply coil portion (counter wound coil portion) may alternatively have a spiral coil shape in which a conductor line is wound in a thickness direction.

While the power supply coil portion and the counter wound coil portion have the same shape in each of the aforementioned first to third embodiments, the present invention is not restricted to this. According to the present invention, the power supply coil portion and the counter wound coil portion may alternatively have different shapes so far as the winding directions of the power supply coil portion and the counter wound coil portion are opposite to each other.

While the circular or rectangular power supply coil portion (counter wound coil portion) is used in each of the aforementioned first to third embodiments, the present invention is not restricted to this. According to the present invention, a polygonal or elliptical power supply coil portion (counter wound coil portion) may alternatively be used, for example.

While the counter wound coil portion is arranged at the side opposite the side at which the receiver is arranged with respect to the power supply coil portion in each of the aforementioned first and second embodiments, the present invention is not restricted to this. According to the present invention, the counter wound coil portion may alternatively be arranged at the side at which the receiver is arranged with respect to the power supply coil portion.

While the inner first end of the power supply coil portion is connected to the alternating-current power supply portion, and the outer second end of the power supply coil portion is connected to ground in each of the aforementioned first to third embodiments, the present invention is not restricted to this. According to the present invention, the inner first end of the power supply coil portion may alternatively be connected to ground, and the outer second end of the power supply coil portion may alternatively be connected to the alternating-current power supply portion.

While the inner first end of the counter wound coil portion is opened, and the outer second end of the counter wound coil portion is connected to ground in each of the aforementioned first to third embodiments, the present invention is not restricted to this. According to the present invention, the inner first end of the counter wound coil portion may alternatively be connected to ground, and the outer second end of the counter wound coil portion may alternatively be opened.

What is claimed is:

1. A power supply device comprising:
   a power supply portion;
   a power supply coil portion having a first end connected to the power supply portion and a second end connected to ground; and
   a counter wound coil portion that faces the power supply coil portion, a winding direction of which is opposite to that of the power supply coil portion, wherein
   the counter wound coil portion has an opened first end and a second end connected to ground.

2. The power supply device according to claim 1, wherein both the power supply coil portion and the counter wound coil portion have planar coil shapes in which conductor lines thereof are spirally wound in predetermined planes.

3. The power supply device according to claim 2, wherein in a direction in which the power supply coil portion and the counter wound coil portion face each other, the conductor lines of the power supply coil portion and the counter wound coil portion are wound in the same shape, and have portions that overlap each other.

4. The power supply device according to claim 3, wherein
the conductor line of the counter wound coil portion has substantially the same winding shape as that of the conductor line of the power supply coil portion, and faces the conductor line of the power supply coil portion, and
a winding center of the counter wound coil portion substantially coincides with a winding center of the power supply coil portion in a plan view.

5. The power supply device according to claim 1, wherein
the counter wound coil portion is arranged with respect to the power supply coil portion to cancel out an electric field that the power supply coil portion generates.

6. The power supply device according to claim 1, wherein
the power supply coil portion and the counter wound coil portion have substantially the same size, as viewed in a direction in which the power supply coil portion and the counter wound coil portion face each other.

7. The power supply device according to claim 1, further comprising a substrate having a surface on which the power supply coil portion and the counter wound coil portion face each other.

8. The power supply device according to claim 7, wherein
the power supply coil portion is provided on a first surface of the substrate, and
the counter wound coil portion is provided on a second surface of the substrate.

9. The power supply device according to claim 7, wherein
both the power supply coil portion and the counter wound coil portion are provided on the same surface of the substrate.

10. The power supply device according to claim 1, wherein
the power supply coil portion and the counter wound coil portion include intersection portions that intersect with each other, as viewed in a direction in which the power supply coil portion and the counter wound coil portion face each other.

11. The power supply device according to claim 10, further comprising an insulator that is arranged between the intersection portion of the power supply coil portion and the intersection portion of the counter wound coil portion and insulates the power supply coil portion and the counter wound coil portion from each other.

12. The power supply device according to claim 10, wherein
the power supply coil portion and the counter wound coil portion each include a plurality of intersection portions, and are line-symmetrical about a line passing through the plurality of intersection portions, as viewed in the direction in which the power supply coil portion and the counter wound coil portion face each other.

13. The power supply device according to claim 1, wherein
the second end of the power supply coil portion and the second end of the counter wound coil portion are connected to each other, and are connected to ground by a common wire.

14. The power supply device according to claim 1, further comprising an installation portion on which a receiver to which power is to be supplied is placed, wherein
the counter wound coil portion is arranged at a side opposite a side at which the installation portion is arranged with respect to the power supply coil portion.

15. The power supply device according to claim 14, wherein
a distance between the power supply coil portion and the counter wound coil portion is smaller than a distance between the installation portion and the power supply coil portion.

16. The power supply device according to claim 1, wherein
outer shapes of both the power supply coil portion and the counter wound coil portion are substantially circular, as viewed in a direction in which the power supply coil portion and the counter wound coil portion face each other.

17. The power supply device according to claim 1, wherein
outer shapes of both the power supply coil portion and the counter wound coil portion are substantially rectangular, as viewed in a direction in which the power supply coil portion and the counter wound coil portion face each other.

18. The power supply device according to claim 1, wherein
a winding axis of a conductor line of each of the power supply coil portion and the counter wound coil portion extends in the same direction, and
the power supply coil portion and the counter wound coil portion face each other in a direction in which the winding axis extends.

19. The power supply device according to claim 1, wherein
a winding axis of a conductor line of each of the power supply coil portion and the counter wound coil portion extends in the same direction, and
the power supply coil portion and the counter wound coil portion are aligned in the same plane such that the conductor lines thereof face each other in a direction orthogonal to the winding axis.

20. The power supply device according to claim 1, wherein
the counter wound coil portion is arranged in the vicinity of the power supply coil portion.

* * * * *